(12) United States Patent
Purdy et al.

(10) Patent No.: US 7,992,454 B2
(45) Date of Patent: Aug. 9, 2011

(54) AIRFLOW BENCH WITH LAMINAR FLOW ELEMENT

(75) Inventors: Michael S. Purdy, Research Triangle Park, NC (US); Mark E. Steinke, Durham, NC (US); Leo H. Webster, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 12/631,571

(22) Filed: Dec. 4, 2009

(65) Prior Publication Data

US 2011/0132071 A1 Jun. 9, 2011

(51) Int. Cl.
*G01F 1/22* (2006.01)
(52) U.S. Cl. .................................................. 73/861.52
(58) Field of Classification Search ............... 73/861.52, 73/861
See application file for complete search history.

(56) References Cited

U.S. PATENT DOCUMENTS

| | | |
|---|---|---|
| 4,800,754 A | 1/1989 | Korpi |
| 5,511,416 A | 4/1996 | Shambayati |
| 5,576,498 A | 11/1996 | Shambayati |
| 5,837,903 A | 11/1998 | Weigand |
| 6,601,460 B1 | 8/2003 | Materna |
| 6,826,953 B2 | 12/2004 | Wang |
| 7,047,822 B2 | 5/2006 | Good et al. |
| 7,161,143 B2 | 1/2007 | De La Mora et al. |
| 7,178,409 B2 * | 2/2007 | Olin et al. .................. 73/861.52 |
| 7,454,984 B1 * | 11/2008 | Ross et al. .................. 73/861.52 |
| 2005/0118350 A1 | 6/2005 | Koulik et al. |
| 2005/0161158 A1 | 7/2005 | Schumacher |
| 2009/0004074 A1 | 1/2009 | Tonkovich et al. |

FOREIGN PATENT DOCUMENTS

| | | |
|---|---|---|
| JP | 02-095248 A | 4/1990 |
| JP | 08-087335 A | 4/1996 |

* cited by examiner

*Primary Examiner* — Jewel Thompson
(74) *Attorney, Agent, or Firm* — Cynthia G. Seal; Jeffrey L. Streets

(57) ABSTRACT

A testing system includes a single air collection box and a laminar flow system for obtain an airflow measurement. The single airflow box has air inlet and outlet ports at opposite ends. The laminar flow element has a laminar flow element inlet in fluid communication with the air collection box and a laminar flow element outlet sealed with the air outlet port of the air collection box. A blower in fluid communication with the laminar flow element outlet draws airflow into the air collection box through a unit under test and out of the air collection box through the laminar flow element. A pressure transducer senses the differential air pressure across the laminar flow element and enables a determination of the airflow rate.

21 Claims, 5 Drawing Sheets

AIRFLOW BENCH WITH LAMINAR FLOW ELEMENT

BACKGROUND

1. Field of the Invention

The present invention relates to airflow measurements and instruments for measuring airflow.

2. Background of the Related Art

An airflow bench is a testing system used to flow air through a unit to be tested (i.e. a "unit under test") to determine the aerodynamic properties of the unit under test. Airflow through a unit, such as computer chassis, is important since the airflow may be responsible for cooling heat-generating devices within the unit. An airflow bench typically includes an air moving device to drive airflow through the unit under test and an airflow measuring device to measure the airflow rate through the unit under test. The measured airflow rate can then be used to evaluate the aerodynamic properties and or thermal properties of the unit. For example, the airflow impedance of the unit under test may be determined based on the measured airflow rate.

Conventionally, the airflow rate is determined according to a pressure difference measured across a nozzle or orifice plate between the two air collection boxes. The first (inlet) collection box is used to collect air output from the unit under test and direct the collected air to the nozzle or orifice plate. The air from the first collection box flows through the nozzle or orifice plate and exits into the second (outlet) collection box. The second collection box guides the air into the air moving device to exhaust the air from the airflow bench. In such an arrangement, the air expands and contracts repeatedly. Specifically, the air expands through the first collection box, contracts through the nozzle or orifice plate, re-expands in the second collection box, and then contracts again into a blower assembly before being exhausted from the airflow bench.

BRIEF SUMMARY

One embodiment of the present invention provides a testing system having a single air collection box. The air collection box has an air inlet port at an inlet end and an air outlet port at an opposing outlet end of the air collection box. A laminar flow system includes a laminar flow element (LFE) in sealed fluid communication with the air collection box at the outlet end and a pressure transducer in fluid communication with the laminar flow element for sensing the differential air pressure across the laminar flow element. A blower is in sealed fluid communication with an outlet of the laminar flow element for generating airflow into the air collection box through a unit under test at the air inlet port and out of the air collection box through the laminar flow element.

DETAILED DESCRIPTION

One embodiment of the present invention provides a testing system having a single air collection box, unlike conventional airflow benches requiring two air collection boxes. The second air collection box is eliminated by exhausting airflow out of the single air collection box to a blower through a LFE, instead of into a second air collection box through a nozzle or orifice plate. Eliminating a second air collection box reduces the pressure and flow losses conventionally incurred due to repeated expansion and contraction of air through two collection boxes. Reducing pressure and flow losses increases the efficiency of the airflow bench and reduces the size of the blower required. Airflow measurements obtained using a single box with an LFE are also more accurate and consistent than measurements obtained using a nozzle or orifice plate disposed between two boxes. For example, a conventional airflow bench typically has an estimated uncertainty in airflow rate on the order of about ±15%, whereas a testing system according to this embodiment of the invention may have an uncertainty as low as about ±3%.

A test unit adapter is provided for releasably coupling a unit under test (UUT) to the air collection box with the airflow passage of the UUT in sealed fluid communication with the air inlet port of the air collection box. The UUT may be a computer system component, such as a computer system chassis or fan. The testing system may include a plurality of test unit adapter plates having variously sized and shaped airflow apertures for accommodating different UUTs. Any of a wide variety of UUTs can be quickly and easily coupled to the airflow collection box using one of the test unit adapter plates. The testing system may optionally also include a plurality of LFE adapter plates, wherein each of the LFE adapter plates has variously sized apertures for accommodating an LFE having a different diameter or configuration to allow measurement of different ranges of airflow rates.

Figure 1:
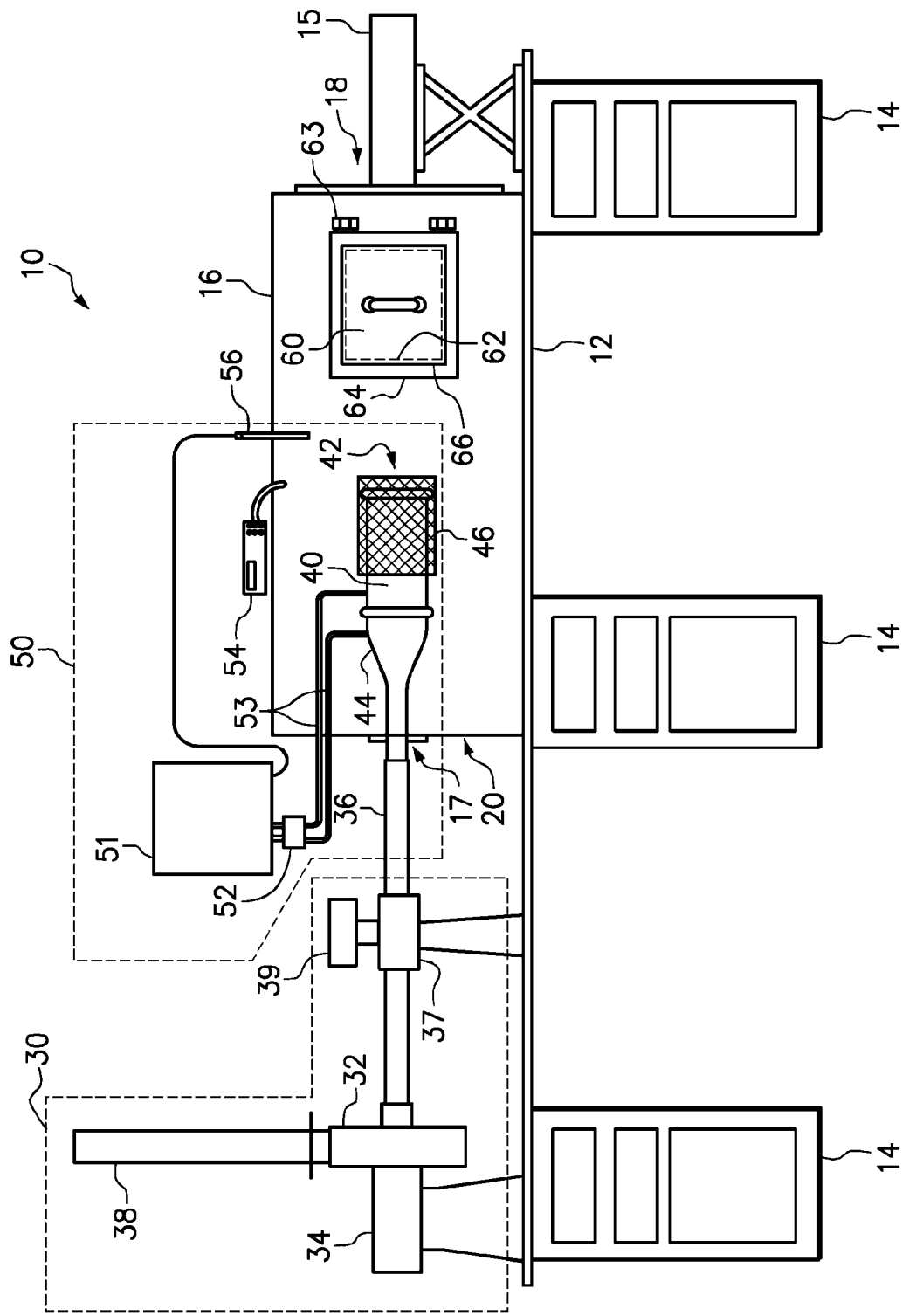
FIG. 1 is a schematic diagram of a testing system according to an embodiment of the invention.

FIG. 1 is a schematic diagram of a testing system ("airflow bench") 10 according to one embodiment of the invention. The testing system 10 is optionally supported on a table top 12 elevated on multiple pillars 14. The testing system 10 includes a single, elongated air collection box 16, a blower assembly 30 in sealed fluid communication with an outlet end 20 of the air collection box 16, and a laminar flow system 50 for generating laminar airflow and obtaining airflow measurements from the laminar airflow. The blower assembly 30 drives airflow into the air collection box 16 through a unit under test (UUT) 15 and out of the air collection box 16 through a laminar flow element (LFE) 40 included with the laminar flow system 50. The LFE 40 generates laminar airflow, from which a controller 51 determines a volumetric airflow rate through the UUT 15. The use of the LFE 40 in combination with a single air collection box 16 provides a more accurate and reliable airflow measurement than with conventional flow measurement devices such as nozzles and orifices.

The blower assembly 30 includes a blower 32 powered by a motor 34. An LFE 40 is encapsulated in a shell or body 44 that passes through the air collection box 16 in sealed fluid communication with an air outlet port 17 at the air outlet end 20, and an LFE inlet 42 inside of and in fluid communication with the airflow box 16. An air filter 46 is provided at the LFE inlet 42 to filter air entering the LFE 40. The air filter 46 filters out air contaminants to prolong the life and accuracy of the LFE 40. The blower assembly 30 is sealingly coupled by a conduit 36 to the LFE 40. An airflow valve 37 is in sealed fluid communication with the conduit 36 for controlling airflow between the LFE 40 and the blower 32. The UUT 15 is sealingly coupled to the air inlet end 18 of the air collection box 16. Thus, all of the airflow driven by the blower 32 through the air collection box 16 enters the air collection box 16 through the UUT 15 and exits the air collection box through the LFE 40. The airflow exiting the LFE 40 passes through the blower 32 and is exhausted through an exhaust section 38. A valve actuator 39 is included to control a valve 37. The valve actuator 39 may be a manually-controlled actuator or an electronically-controlled actuator. A manually-controlled actuator may be used to adjust airflow through the valve 37 by hand. An electronically-controlled actuator may be used to control the valve 37 electronically and/or remotely, such as by a computer. The valve actuator 39 may be used, for example, to adjust the airflow rate through the testing system 10, such as to test the thermal profile of the UUT 15 at one or more airflow rates. The blower assembly 30 diagrammed in this embodiment provides just one example of a device for drawing airflow into the air collection box 16 through the UUT 15 and out through the LFE 40. However, alternative blower configurations for inducing airflow are also within the scope of the invention.

The laminar flow system 50 may include some commercially available components configured for use with the testing system 10. The laminar flow system includes a commercially available controller 51 for receiving and processing various inputs. A pair of air tubes 53 in fluid communication with the LFE 40 extend to a tube manifold 52 at the controller 51. Sensor elements in communication with the controller 51 are used to obtain the differential pressure of air at the tube manifold 52 corresponding to the differential pressure at the LFE 40. The measured differential pressure is used to determine the airflow rate based upon a previous characterization or calibration of the LFE. A static pressure transducer 54 is coupled to the air collection box 16 for obtaining the static pressure of the air entering the LFE 40. The static pressure is used in determining the UUT aerodynamic performance. A plot of static pressure versus the volumetric airflow rate (not shown) is a useful representation of the UUT performance, as well as a measure of the impedance to airflow. The laminar flow system 50 also includes a temperature and humidity probe 56 coupled to the controller 51 for measuring temperature and humidity. The temperature and humidity probe 56 is positioned in the air collection box 16 for measuring the temperature and humidity of the air in the air collection box 16. The measured temperature and humidity may be used, for example, to correct for pressure measurements that are influenced by air temperature and or humidity. The controller 51 preferably includes calibration data for the LFE 40 so that the controller 51 can determine the airflow rate as a function of the differential pressure, temperature of the air, humidity of the air, and the density of the air through the LFE.

An optional access opening 62 is provided on a side of the air collection box 16 between the air inlet end 18 and the air outlet end 20. The access opening 62 provides access to the inside of the air collection box, such as to install, remove, connect or reposition the UUT 15 by hand. An access door 60 is used to selectively close the access opening 62. The access door 60 is shown in a closed position. A seal 66 is provided along the periphery of the access opening 62 for sealing between the access door 60 and the air collection box 16 when in the closed position, so that air cannot enter or escape from the airflow box 16 through the access opening 62. The access door 60 is optionally hinged on one end by hinges 63 for moving the access door 60 between an open position and the closed position. An alternative embodiment of the access door 60 may be releasably secured to the air collection box 16 in the closed position by toggle clamps, such as toggle clamps 80 discussed in relation to FIGS. 6 and 7.

Figure 2:
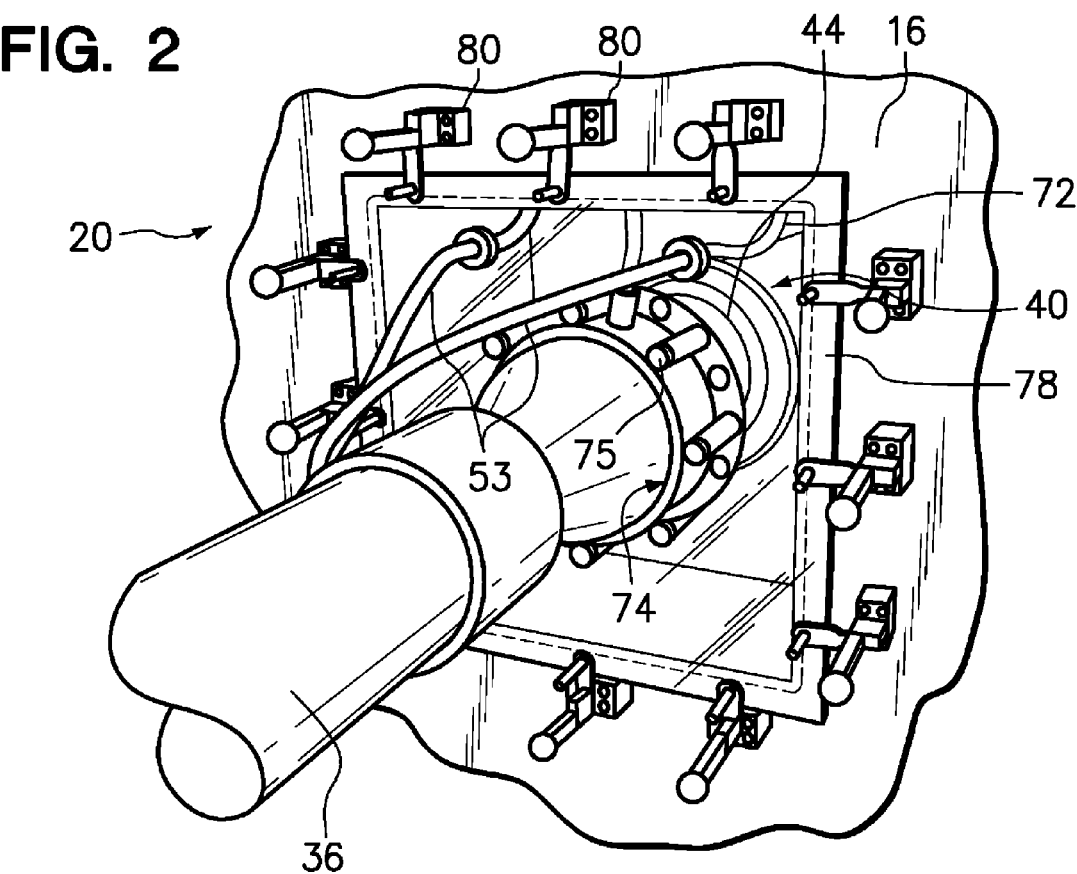
FIG. 2 is a perspective view of the testing system facing the outlet end of the air collection box.

FIG. 2 is a perspective view of the testing system 10 facing the outlet end 20 of the air collection box 16, showing the LFE 40 in sealed fluid communication with the outlet end 20. An LFE adapter plate 72 (shown here as a transparent plate) has an aperture 74 for receiving the LFE 40. The body 44 of the LFE 40 fills the aperture 74, and is sealed with the adapter plate 72 by a sealing member 75 (e.g. formable putty or rubber gasket) so air does not leak between the body 44 and the adapter plate 72. A plurality of LFE adapter plates 72 may be provided as a set, each having a different size of aperture 74 for optionally accommodating a selected one of a plurality of different LFEs, which can range in size and recommended airflow rate. The LFE adapter plate 72 and the body 44 of the LFE 40 could alternatively be formed as a unitary structure, rather than having a separable LFE 40 and LFE adapter plate 72.

Toggle clamps 80 are used to quickly and reliably mount the LFE adapter plate 72 and the attached LFE 40 to the outlet end 20 of the air collection box, which positions the LFE 40 in fluid communication with the air collection box 16 as shown in FIG. 1. The toggle clamps 80 hold the LFE adapter plate 72 against the outlet end 20 of the air collection box 16. A seal 78, such as an o-ring, double o-ring or other gasket, is optionally positioned between the outlet end 20 and the LFE adapter plate 72, to seal between the outlet end 20 and the LFE adapter plate 72. The toggle clamps 80 provide a uniformly-distributed clamping force along the perimeter of the LFE adapter plate 72. The uniformly-distributed clamping force provided by the toggle clamps 80 retains the LFE 40 in the desired position during testing, and engages the seal 78, to prevent leakage from occurring between the outlet end 20 and the LFE adapter plate 72. To subsequently switch to a different size LFE 40, the toggle clamps 80 may be released, and a different LFE 40 and LFE adapter plate 72 may be sealingly coupled over the outlet port 17.

Figure 3:
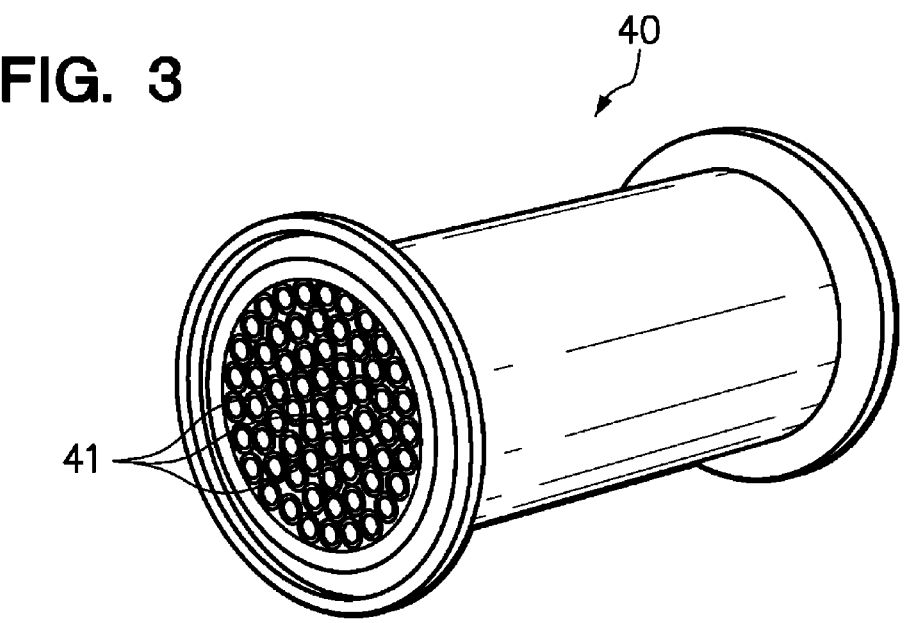
FIG. 3 is a perspective view of the internal structure of an example of a commercially-available type of LFE.

FIG. 3 is a perspective view of the internal structure of an example of a commercially-available type of LFE (the "example LFE") that may be selected as the LFE 40 of FIG. 1. The example LFE includes numerous parallel tubes, referred to in this context as capillaries 41, internal to the example LFE. The parallel capillaries 41 force airflow through the example LFE to become laminar, even if airflow in the air collection box 16 is turbulent prior to entering the example LFE. The example LFE obtains airflow measurements using the principle of effective differential measurement. The example LFE produces a low differential pressure that is linearly proportional to the airflow rate through the example LFE, in contrast to airflow measurements using nozzles and orifice plates, which bear a quadratic relationship between the differential pressure and the airflow rate. The linear relationship between the differential pressure and the airflow rate is attributable in part to the flow induced by the relatively smaller capillaries 41 used in the example LFE. The linear relationship between the differential pressure and the airflow rate through the example LFE allows for an especially accurate airflow measurement, and enables a large range of airflow rates for which reliable airflow measurements may be obtained. Using the example LFE, valid airflow measurements may be obtained for less than 1/20th of the full scale differential pressure.

Figure 4:
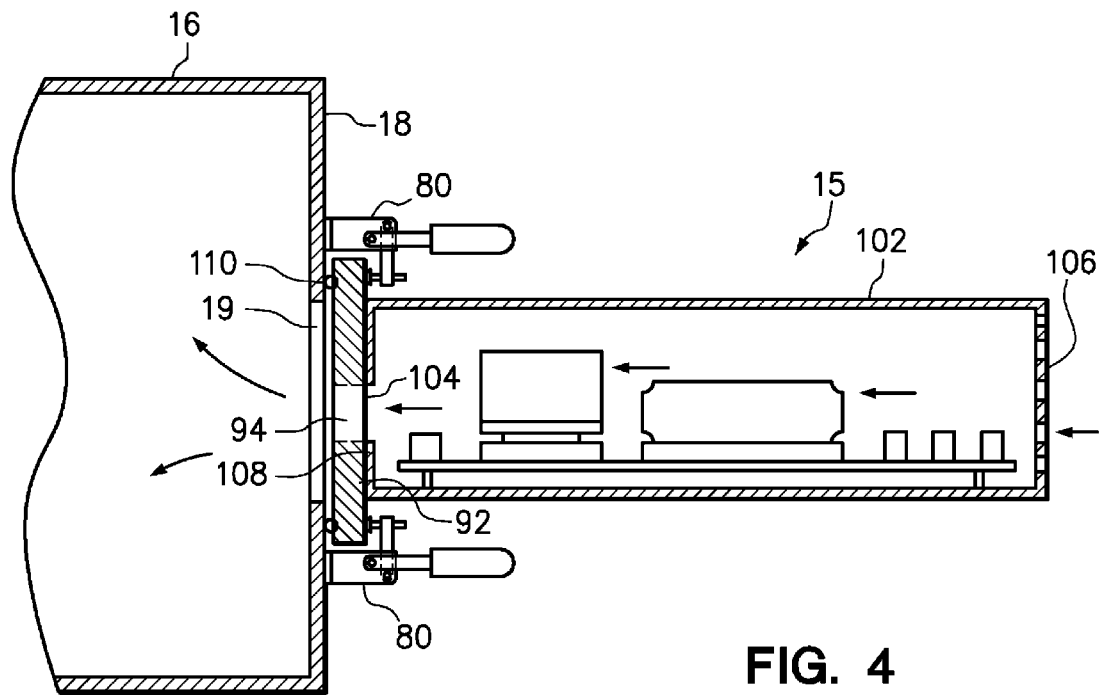
FIG. 4 is a partially-sectioned side view of the air collection box with a UUT coupled to the air inlet end using a test unit adapter plate.

FIG. 4 is a partially-sectioned side view of the air collection box 16 with a UUT 15 sealingly coupled to the air inlet end 18 using a test unit adapter plate 92. The UUT 15 is drawn as a computer chassis, by way of example. The UUT 15 has a rigid body 102 and an airflow passage 104 through the rigid body 102 from a first face 106 to a second face 108. The UUT 15 is attached to the test unit adapter plate 92 with the airflow passage 104 of the UUT 15 in fluid communication with the aperture 94 in the test unit adapter plate 92, and with the aperture 94 in the test unit adapter plate 92 in fluid communication with an air inlet port 19. The UUT 15 may have been permanently coupled to the test unit adapter plate 92, for example by epoxying, or temporarily coupled to the test unit adapter plate 92, such as using threaded fasteners or even adhesive tape. A gasket preferably provides a seal between the rigid body 102 of the UUT 15 and the test unit adapter plate 92 about the perimeter of the aperture 94 and the airflow passage 104, so that all of the airflow through the airflow passage 104 is forced to pass through the aperture 94. The test unit adapter plate 92 is releasably secured to the air inlet end 18 of the air collection box 16 using toggle clamps 80. A gasket or o-ring 110 is provided to seal between the test unit adapter 90 and the air inlet end 18.

Figure 5:
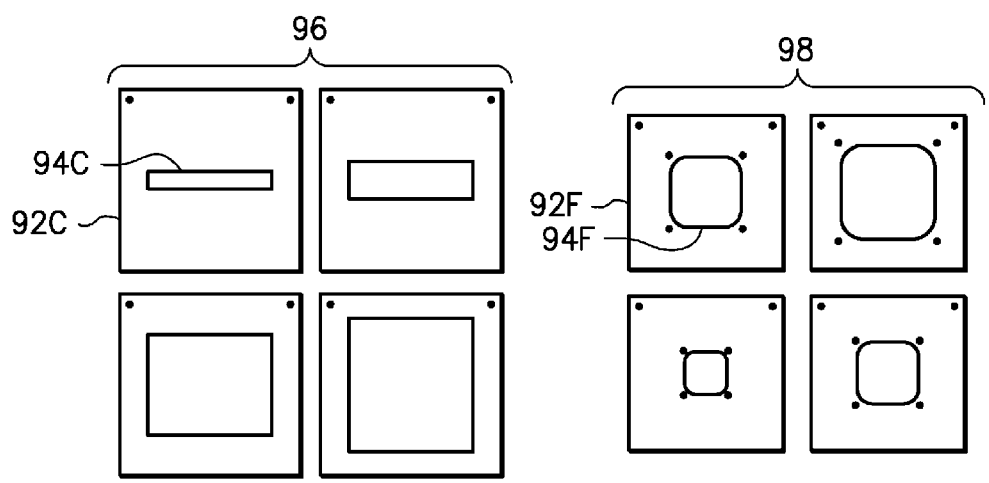
FIG. 5 is a schematic diagram of examples of UUT adapter plates, including a set of chassis adapter plates and fan adapter plates.

The particular type of UUT adapter plate used for mounting a UUT to the air collection box may be selected according to the type and size of unit to be tested. FIG. 5 is a schematic diagram of a set 96 of chassis adapter plates 92C for use with different computer chassis as the UUT, and a set 98 of fan adapter plates 92F for use with different computer system fans as the UUT. The apertures 94C of the chassis adapter plates 92C are shaped and sized for testing different sizes of computer system chassis. In particular, the apertures 94C of the chassis adapter plates 92C are each rectangular, and vary in size. The apertures 94F of the fan adapter plates 94F are shaped and sized for testing different sizes of computer system fans. In particular, the apertures 94F of the fan adapter plates 92F are generally square, with rounded corners. The set of fan adapter plates 98 have their apertures 94 shaped and sized for testing various sizes of computer fans as the unit under test.

Figure 6:
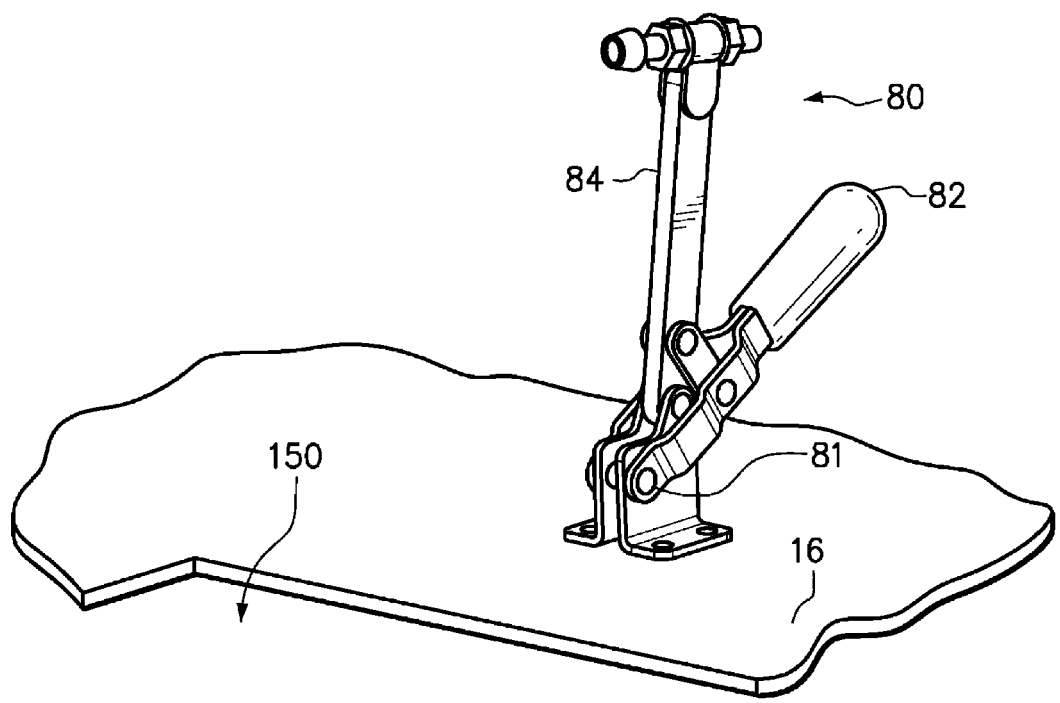
FIG. 6 is a perspective view of the toggle clamp secured to the air collection box in an unclamped position.
Figure 7:
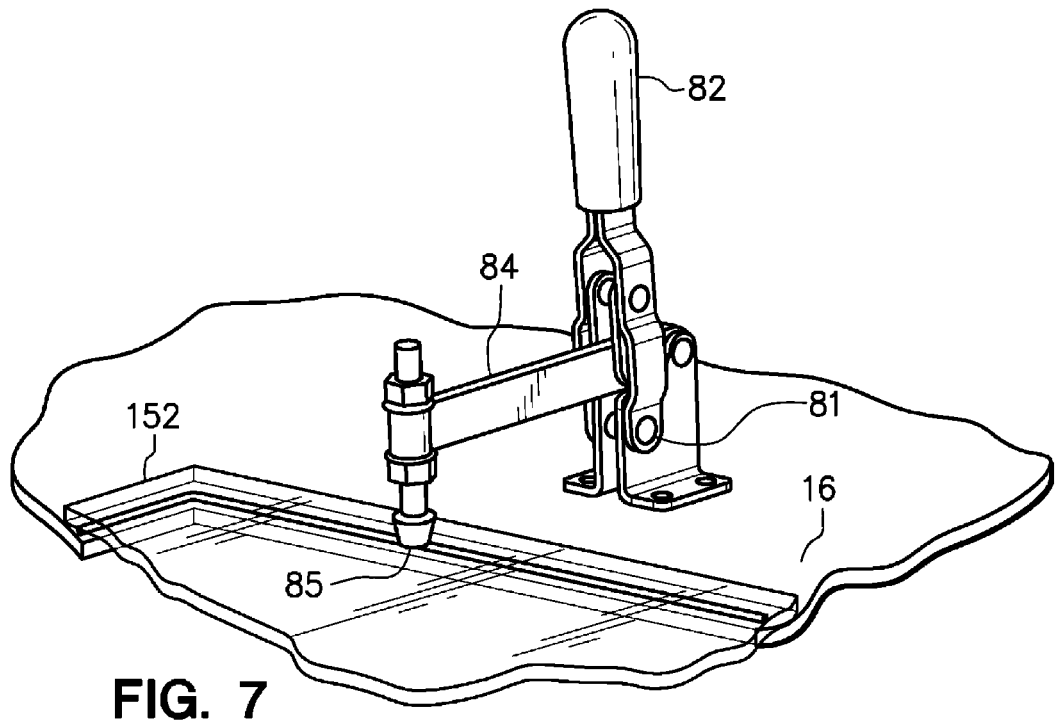
FIG. 7 is a perspective view of the toggle clamp moved to a clamped position against an adapter plate or door.

FIGS. 6 and 7 illustrate a sequence of clamping an LFE adapter plate (see FIG. 2), a UUT adapter plate (see FIGS. 4-5), or an access door (see FIG. 1), to the air collection box 16 using toggle clamps 80. A variety of toggle clamps are commercially available, and may be adapted for use with an air collection box as described herein. However, other types of clamps, and other types of retainers and methods that do not involve the use of clamps, may alternatively be used to couple an LFE adapter plate, UUT adapter plate, or access door to an air collection box.

FIG. 6 is a perspective view of the toggle clamp 80 secured to the air collection box 16 in an unclamped position next to an opening 150. The opening 150 may be, for example, an air inlet port of the air collection box 16 for fluid communication with a UUT, an air outlet port of the air collection box 16 for fluid communication with an LFE, or an access opening of the air collection box 16 for positioning a UUT. Each toggle clamp 80 includes a handle 82 pivotable about a pivot point 81. An arm 84 is actuated by pivoting the handle 82 by hand about the pivot point 81. In the unclamped position of FIG. 6, the arm 84 is positioned up and away from the opening 150 in the air collection box. With the arm 84 moved up and away from the opening 150, an adapter plate or door may be positioned over the opening 150.

FIG. 7 is a perspective view of the toggle clamp 80 moved to a clamped position against the adapter plate or door 152. The handle 82 has been pivoted about the pivot point 82 relative to its position in FIG. 6, to move the arm 84 into clamping engagement with the adapter plate or door 152. A finger 85 projecting from the arm 84 engages the adapter plate or door 152. The structure of the commercially available toggle clamp 80 locks the clamp 80 in the closed position, as generally understood in the art apart from its application in an embodiment of the present invention. The adapter plate or door 152 may be subsequently released by returning the handle 82 to the unclamped position of FIG. 6.

Figure 8:
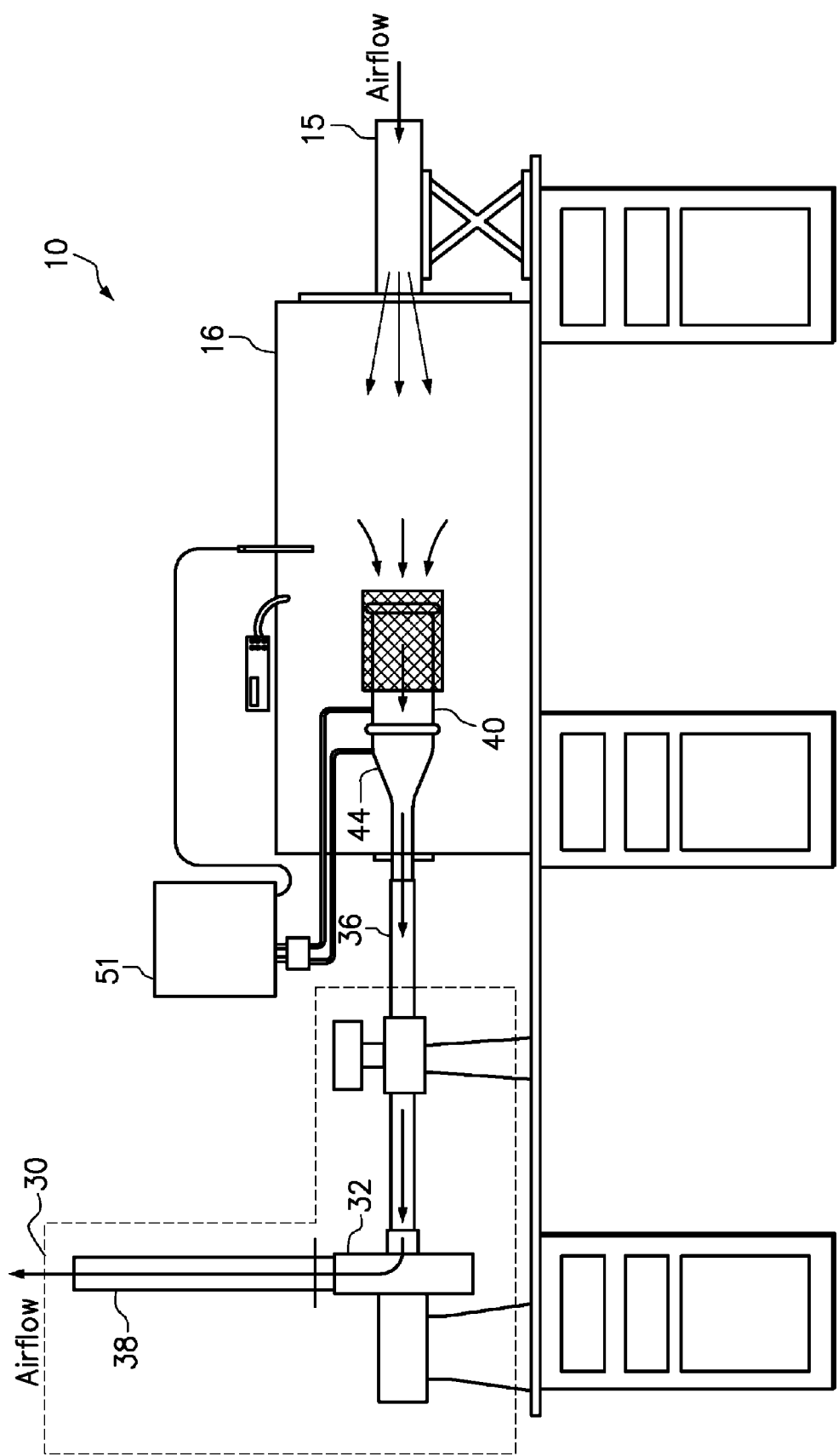
FIG. 8 is a schematic diagram of the testing system illustrating the path of airflow during testing.

FIG. 8 is a schematic diagram of the testing system 10 illustrating the path of airflow during testing of the unit under test 15. The unit under test 15, air collection box 16, and blower 32 are arranged in series, so that airflow enters the air collection box 16 only through the unit under test 15 and exits the air collection box 16 only through the LFE 40. The airflow passes first through the unit under test 15 and then the air expands as it enters the collection box 16. The air then contracts as it enters the LFE 40. The air then flows directly from the LFE 40 out through the conduit 36 to the blower 32, where the air is exhausted through the exhaust section 38. The differential pressure is measured across the LFE 40, rather than across two neighboring collection boxes. Because all the air flowing through the air collection box 16 directly exits the air collection box 16 through the LFE 40, and the differential pressure is measured within the LFE 40, no second collection box is required. Thus, the air only expands once (entering the single collection box 16 through the unit under test 15) and contracts once (exiting the single collection box 16 through the LFE 40) occurs. Accordingly, the accuracy of the airflow measurements obtained by the controller 51 is significantly improved as compared with measurements using conventional airflow benches having two air collection boxes.

Incorporating the LFE 40 directly into the testing system 10 yields airflow measurements independent of Reynolds numbers. This trait of the LFE 40 allows for a broader dynamic range of airflow that directly scales over multiple ranges. By contrast, a conventional airflow device (e.g. nozzle or orifice) has a narrower specified range of airflow for which reasonably accurate airflow measurements may be obtained. For example, when introducing airflow through a nozzle having a Reynolds number outside a specified range, the nozzle behaves differently, making it unreliable as a flow measuring device outside the specified range. While the LFE also has a finite flow range, the response is unaffected by the Reynolds number of airflow entering the LFE. Therefore, it is possible to use a particular LFE over a wider range of Reynolds number and thus airflow rates.

In summary, a testing system constructed according to an embodiment of the invention may be used to obtain airflow measurement having outstanding reliability and accuracy. The LFE generates laminar flow, providing a linear response over a large range of airflow rates. The use of a single air collection box avoids the repeated expansion and contraction of airflow, to provide greater efficiency and accuracy. The sealing system separately provided for the unit under test, LFE, and access door further minimizes losses and promotes reliability and ease of use. The use of the LFE adapter and test unit adapter described above provides an airtight sealing system so that all of the airflow into an air collection box enters through the unit under test and exits through the LFE. Both component-specific and universal test unit adapter plates may be provided to allow for efficient attachment of test units. The LFE adapter and test unit adapter seal automatically when attached to an air collection box, requiring no additional materials. Marked improvement in sealing, repeatability of airflow measurements and test results, and ease of attachment are all a product of the disclosed embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A testing system, comprising:
    a single air collection box having an air inlet port at an inlet end and an air outlet port at an opposing outlet end of the air collection box;
    a laminar flow system including a laminar flow element in sealed fluid communication with the air collection box at the outlet end and a pressure transducer in fluid communication with the laminar flow element for sensing the differential air pressure across the laminar flow element; and
    a blower in sealed fluid communication with an outlet of the laminar flow element for generating airflow into the air collection box through a unit under test at the air inlet port and out of the air collection box through the laminar flow element.

2. The testing system of claim 1, further comprising:
    a set of test unit adapter plates, each test unit adapter plate including an aperture having a different size or shape than the apertures of the other test unit adapter plates in the set, wherein each test unit adapter plate is releasably attached to a respective one of a plurality of different units under test;
    a plurality of clamps secured to the inlet end of the air collection box about the air inlet port for interchangeably mounting any one of the test unit adapter plates over the air inlet port with an airflow passage of the attached unit under test in fluid communication with the air inlet port of the air collection box; and
    a seal for sealing between the air collection box and the mounted test unit adapter plate.

3. The testing system of claim 2, wherein the clamps secured to the inlet end of the air collection box comprise toggle clamps for releasably mounting any one of the test unit adapters over the air inlet port.

4. The testing system of claim 2, wherein each unit under test is releasably mounted to the respective test unit adapter plate using threaded fasteners.

5. The testing system of claim 2, wherein one or more of the test unit adapter plates includes a rectangular aperture for use with a computer chassis as the unit under test.

6. The testing system of claim 2, wherein one or more of the test unit adapter plates includes a generally square aperture for use with a computer fan as the unit under test.

7. The testing system of claim 1, further comprising:
    a laminar flow element adapter for releasably coupling the laminar flow element to the air collection box with the laminar flow element in sealed fluid communication with the air collection box.

8. The testing system of claim 7, wherein the laminar flow element adapter comprises:
    a laminar flow element adapter plate having an aperture sealed about the laminar flow element; and
    a plurality of clamps secured to the outlet end of the air collection box about the air outlet port for releasably mounting the laminar flow element adapter plate at the air outlet end of the air collection box.

9. The testing system of claim 8, wherein the clamps secured to the outlet end of the air collection box comprise toggle clamps for releasably mounting the laminar flow element adapter.

10. The testing system of claim 1, further comprising:
    an access opening on a side wall of the air collection box; and
    an access door selectively covering and sealing the access opening.

11. The testing system of claim 10, further comprising:
    a plurality of clamps secured to the air collection box about the access opening for releasably mounting the access door over the access opening.

12. The testing system of claim 11, wherein the plurality of clamps secured to the air collection box about the access opening comprise toggle clamps.

13. The testing system of claim 10, wherein the access door is hinged for moving the access door between an open position and the closed position.

14. The testing system of claim 1, further comprising:
    a valve in sealed fluid communication with an outlet of the laminar flow element for controlling airflow between the laminar flow element and the blower.

15. The testing system of claim 14, further comprising:
    an actuator for controlling the valve.

16. The testing system of claim 15, further comprising:
    a controller for electronically controlling the position of the actuator.

17. The testing system of claim 1, wherein the laminar flow system further comprises:
    a static pressure transducer coupled to the air collection box for sensing static pressure of airflow entering the laminar flow element.

18. The testing system of claim 1, wherein the laminar flow system further comprises:
    a temperature probe for sensing the temperature of airflow entering the laminar flow element.

19. The testing system of claim 1, wherein the laminar flow system further comprises:
   a humidity probe for sensing the humidity of the airflow entering the laminar flow element.

20. The testing system of claim 1, wherein the laminar flow system further comprises:
   a pressure device for sensing the air density of the airflow entering the laminar flow element.

21. The testing system of claim 1, wherein the unit under test is a computer fan or a computer chassis.

* * * * *